(12) United States Patent
Reilly

(10) Patent No.: US 7,225,761 B2
(45) Date of Patent: Jun. 5, 2007

(54) PET PRODUCT WITH DEVICE FOR HOLDING INFORMATION ARTICLE

(76) Inventor: Susan C. Reilly, 416 Delaware Ave., Egg Harbor Township, NJ (US) 08234

( * ) Notice: Subject to any disclaimer, the term of this patent is extended or adjusted under 35 U.S.C. 154(b) by 182 days.

(21) Appl. No.: 10/973,325

(22) Filed: Oct. 26, 2004

(65) Prior Publication Data

US 2005/0087150 A1   Apr. 28, 2005

Related U.S. Application Data

(60) Provisional application No. 60/514,570, filed on Oct. 27, 2003.

(51) Int. Cl.
  *A62D 35/00*  (2006.01)
  *G09F 3/00*  (2006.01)
(52) U.S. Cl. .................. 119/858; D30/155; 40/302; 40/640; 40/649; 40/633; 40/303
(58) Field of Classification Search ............... 119/858, 119/856, 702, 792, 712; D30/155; 40/299.1, 40/642, 633, 304, 302, 649, 640, 303, 300, 40/642.02, 652, 5, 661.06, 673, 666
See application file for complete search history.

(56) References Cited

U.S. PATENT DOCUMENTS

| | | | | |
|---|---|---|---|---|
| 1,128,136 A | * | 2/1915 | Hano | 150/147 |
| 2,255,999 A | * | 9/1941 | Kuehner | 63/19 |
| 2,680,315 A | * | 6/1954 | McHugh et al. | 40/303 |
| 2,890,534 A | * | 6/1959 | Quayle | 40/303 |
| 3,088,234 A | * | 5/1963 | Lesser et al. | 40/640 |
| D202,973 S | * | 11/1965 | Field | D20/27 |
| 3,585,743 A | * | 6/1971 | Jeffers | 40/665 |
| 4,137,660 A | | 2/1979 | Dettmann et al. | |
| 4,178,879 A | | 12/1979 | Cunningham | |
| 4,215,497 A | * | 8/1980 | Levy | 40/649 |
| 4,337,590 A | * | 7/1982 | Jackson | 40/615 |
| 4,739,566 A | * | 4/1988 | Smith | 40/303 |
| 4,745,695 A | * | 5/1988 | Hetzer | 40/661 |
| 5,355,839 A | * | 10/1994 | Mistry | 119/858 |
| 5,454,350 A | * | 10/1995 | Betheil | 119/858 |
| 6,735,894 B2 | | 5/2004 | Crusenberry et al. | |
| 2005/0081417 A1 | * | 4/2005 | Valiulis | 40/661 |
| 2005/0235539 A1 | * | 10/2005 | Story | 40/633 |
| 2005/0263106 A1 | * | 12/2005 | Steinbacher | 119/858 |

FOREIGN PATENT DOCUMENTS

EP       0377772 A1  *  2/1989

* cited by examiner

*Primary Examiner*—Andrea M. Valenti
(74) *Attorney, Agent, or Firm*—Knoble Yoshida & Dunleavy, LLC

(57) ABSTRACT

A device for holding identification information for pets is disclosed. The device is attachable to a collar, harness or leash. The device permits new identification information to be placed within it. Identification information may be placed within a slot located on the side of the device or can alternatively be placed inside the device by opening a securing member that can function like a door.

18 Claims, 12 Drawing Sheets

PET PRODUCT WITH DEVICE FOR HOLDING INFORMATION ARTICLE

This application claims priority under 35 U.S.C. §119(e) based on U.S. Provisional Application Ser. No. 60/514,570, filed Oct. 27, 2003, the entire disclosure of which is hereby incorporated by reference as if set forth fully herein.

BACKGROUND OF THE INVENTION

1. Field of the Invention

The invention relates to the field of pet products. In particular the invention relates to an information holding device for use with pets.

2. Description of the Related Technology

Responsible owners of pets, and particularly those pets that are likely to stray outdoors, will typically want to provide some form of identification carried by the pet that identifies the name and address of the pet and/or pet's owner. Typically this information is placed on the pet's collar in a permanent fashion with a hanging tag. In the event that the tag falls off the collar and is lost, which frequently occurs, the tag is rendered useless. Furthermore, in the event the pet and/or pet owner's address or information changes the hanging tag becomes useless, as it is usually impractical to alter.

In the past, some pet collars have been developed in order to counter this problem. U.S. Pat. No. 4,137,660 to Dettmann et al. discloses a pet collar with a tag holder. Identification information is placed under a transparent plastic window that is lifted in order to place the identification information underneath. Although able to change identification information on the collar itself, an owner is not able to transfer that information to another collar unless that collar is similarly equipped.

U.S. Pat. No. 4,178,879 to Cunningham also discloses a collar with a transparent window. The identification information is slid underneath a transparent plastic window on the collar. Although able to change identification information, an owner is not able to place to the information on any available collar.

Therefore, there exists a need for providing a dog collar with the ability to change identification information on the collar along with the capability of being able to transfer existing identification information to different collars.

SUMMARY OF THE INVENTION

Accordingly, it is an object of the invention to provide an information article holding device that is capable of having the information article be replaced.

According to a first aspect of the invention an information article holding device is disclosed having holding structure for holding an information article, an attachment member for attaching the holding structure, and structure for replacing the information article while the holding structure is attached.

According to a second aspect of the invention, a collar is disclosed having holding structure for holding an information article and a securing member enabled to close and open the holding structure.

According to a third aspect of the invention, an information article holding device is disclosed having holding structure for holding an information article, a securing member enabled to close and open the holding structure, wherein the securing member further attaches the holding structure to a collar.

According to a fourth aspect of the invention, an information article holding device is disclosed having attachment structure for removably placing a holding device on a collar, viewing structure for viewing an information article and replacement structure for replacing the information article in the holding device while the holding device is attached to the collar.

According to a fifth aspect of the invention, a method for changing an information tag is disclosed having the steps of placing a first information article in a holding device, attaching the holding device to a collar, and replacing the first information article with a second information article within the holding device.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
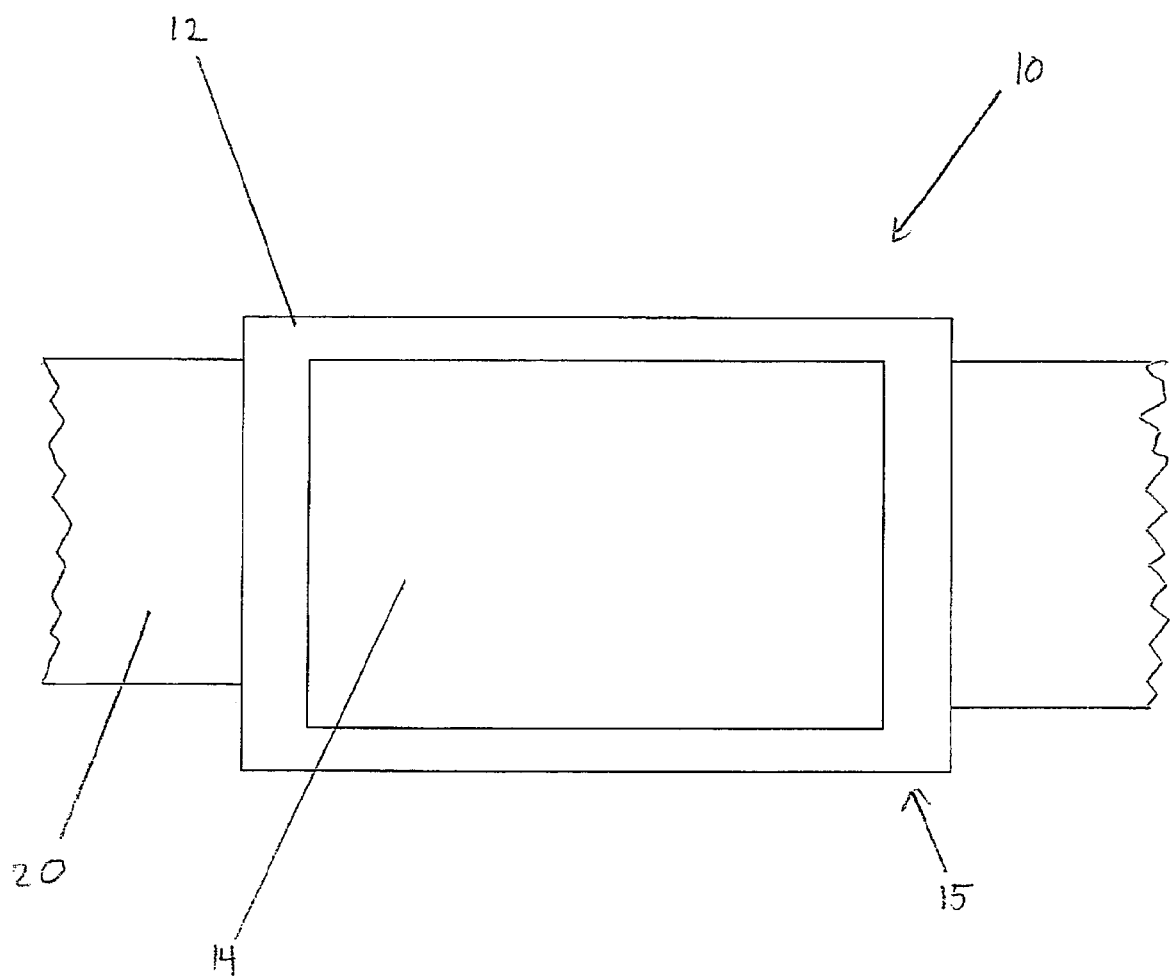
FIG. 1 shows a front view of a holding device when seen attached to a pet collar.

Referring now to the drawings, wherein like reference numerals designate corresponding structure throughout the views, and referring now to FIG. 1, a front view of a first embodiment of holding device 10 is shown.

In FIG. 1, holding device 10 is attached to collar 20. As shown, holding device 10 is generally rectangular in shape, however other geometries are possible such as square, circular, triangular, or some other ornamental or artistic shape, such as bone-shaped, flower-shaped, etc. Frame 12 comprises the front portion of holding device 10 and forms part of securing member 15. Frame 12 frames window 14. Window 14 functions as structure for viewing information article 40, shown in FIG. 7. Preferably, window 14 is constructed of a transparent plastic material so as to permit viewing of information article 40. Window 14 and frame 12 also serve to protect information article 40 from being damaged by external forces such as inclement weather or other animals. Window 14 can be secured in frame 12 by either mechanical means, chemical means, or by being physically bonded to interior perimeter of frame 12.

It is also possible to not have window 14 and simply have any identification information be retained by frame 12 within holding device 10. When window 14 is not present it is preferable that information article 40 is constructed of a durable material such as plastic, metal, or a hard ceramic material in order to prevent damage to information article 40.

Figure 2:
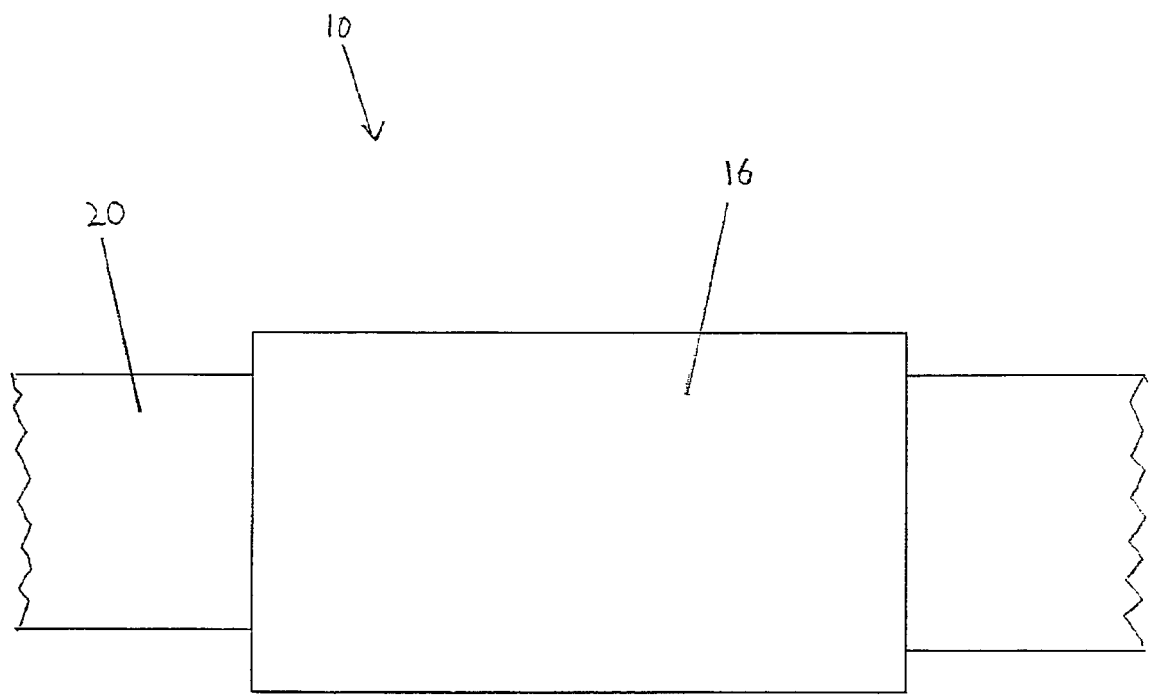
FIG. 2 shows a rear view of a holding device when seen attached to a pet collar.

FIG. 2 shows a rear view of a holding device 10 when seen attached to collar 20. The view in FIG. 2 is of the side of collar 20 that would be pressed against the fur or flesh of an animal when collar 20 is worn. Back portion 16 acts as attachment structure for holding device 10 and is used to attach holding device 10 to collar 20. FIG. 2 shows back portion in a closed position. Back portion 16 may be constructed of the same material as frame 12 of holding device 10. Alternatively back portion 16 may be constructed of a different material, such as rubber, in order to increase friction between collar 20 and back portion 16.

Figure 3:
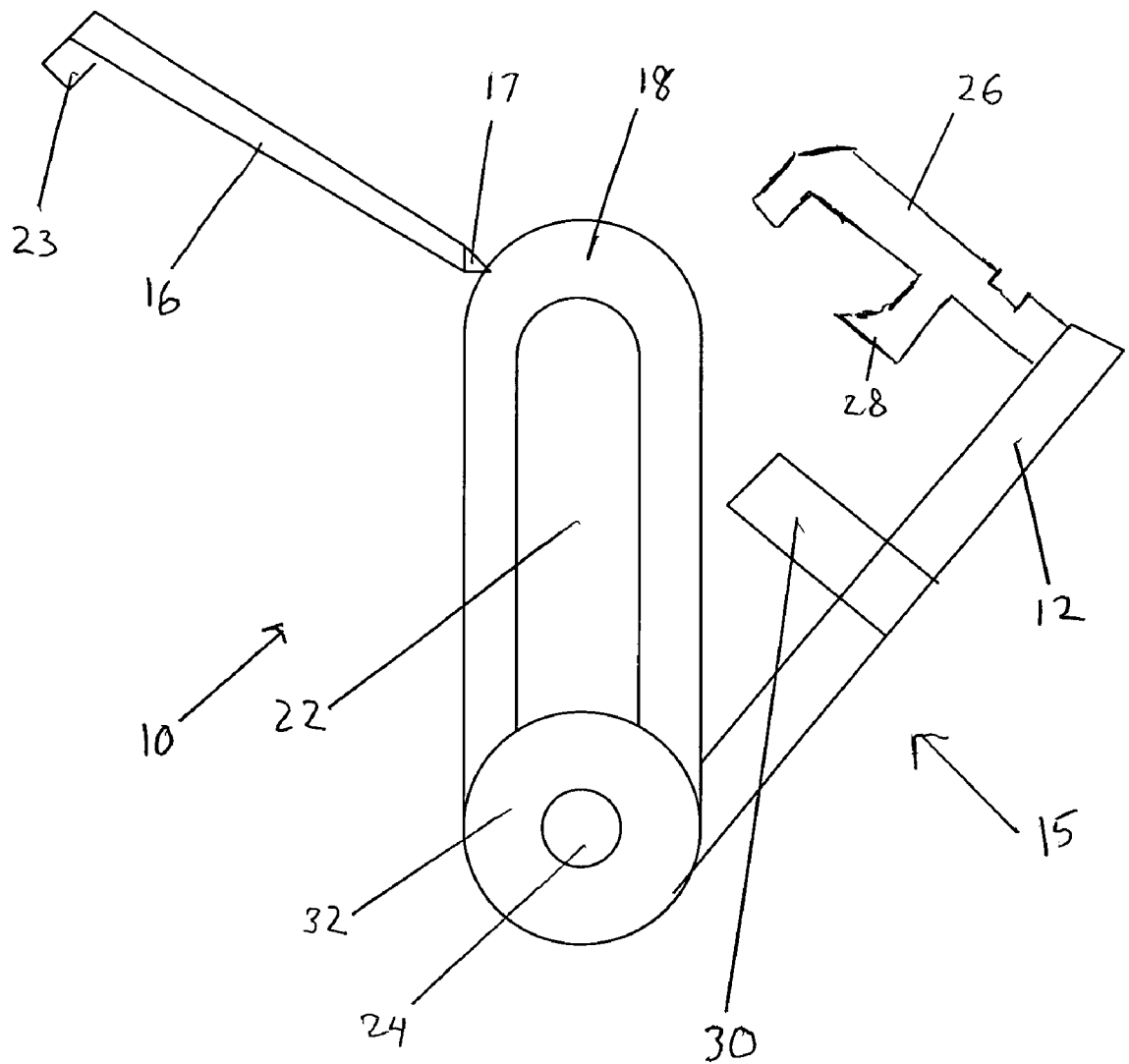
FIG. 3 shows a side view of a holding device.

FIG. 3 shows a side view of holding device 10. In FIG. 3 back portion 16 can be seen in an open position. Back portion 16 is attached to side portion 18 via pivot members 17, which function in a hinge-like manner. Pivot members 17 permit back portion 16 to pivot from an open position shown in FIG. 3 to a closed position shown in FIG. 2. When back portion 16 is in an open position, a collar 20 is placed between back portion 16 and rear wall 19, shown in FIG. 4. Back portion 16 is then moved to a closed position and secured to rear wall 19 via snap member 23 thereby attaching holding device 10 to collar 20.

Side portion 18 forms the sides of holding member 10 and has a slot 22 formed on a side of the holding member. Side portion 18 also has axle 24 which functions with rotation member 32 in order to move securing member 15 from an open position to a closed position. As is clearly shown in the drawings, side portion 18 and axle 24 are characterized by rounded edges that decreases chaffing and discomfort of the pet.

Securing member 15 functions to secure information article 40 within holding device 10. Frame 12 forms part of securing member 15. Rotation member 32 rotates around axle 24 and moves securing member 15 from an open position to a closed position. Securing member 15 functions like a door with respect to holding device 10. When moving into a closed position, the structural configuration of snap portion 28 and clasping portion 26 act together to maintain securing member 15 in a closed position. Clasping portion 26 fits the contours of side portions 18 and with side portions 18 guides securing member 15 to its proper location in the closed position. Snap portion 28 engages snap engagement portion 34, shown in FIG. 4, and prevents securing member 15 from moving until securing member 15 is released from snap engagement portion 34. Slot blocking member 30 is located at a midpoint of side slot 22 when securing member 15 is in a closed position in order to effectively k prevent information article 40 from falling out of holding device 10. The closing structures may vary depending upon manufacturing needs and quality control.

When an information article 40 needs to be replaced, securing member 15 is moved to its open position and the information article 40 that need to be replaced is removed from holding device 10. A new information article 40 is then placed within holding device 10 and securing member 15 is then returned to its closed position and snapped shut. The process of placing a new information article 40 within holding device 10 can be accomplished while collar 20 is still being worn.

Figure 4:
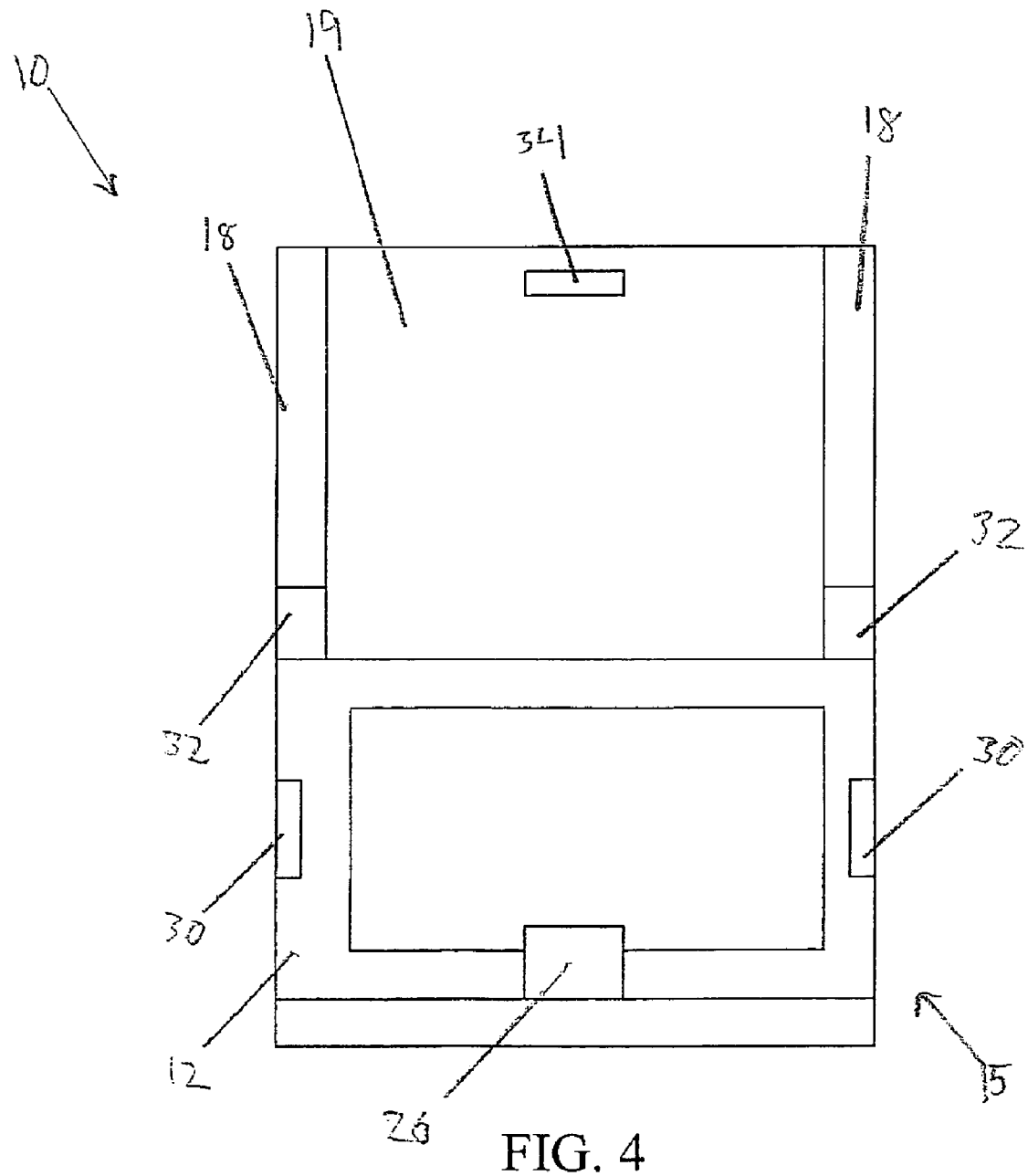
FIG. 4 shows an interior view of a holding device with a securing member in an open position.

FIG. 4 shows an interior view of a holding device 10 with securing member 15 in an open position. The interior view shows rear wall 19 of holding device 10. Rear wall 19 has snap engagement portion 34 formed therein. When securing member 15 moves to a closed position, snap portion 28 engages snap engagement portion 34 and prevents securing member 15 from moving. The space formed between rear wall 19 and frame 12 when securing member 15 is in the closed position acts to hold information article 40.

Figure 5:
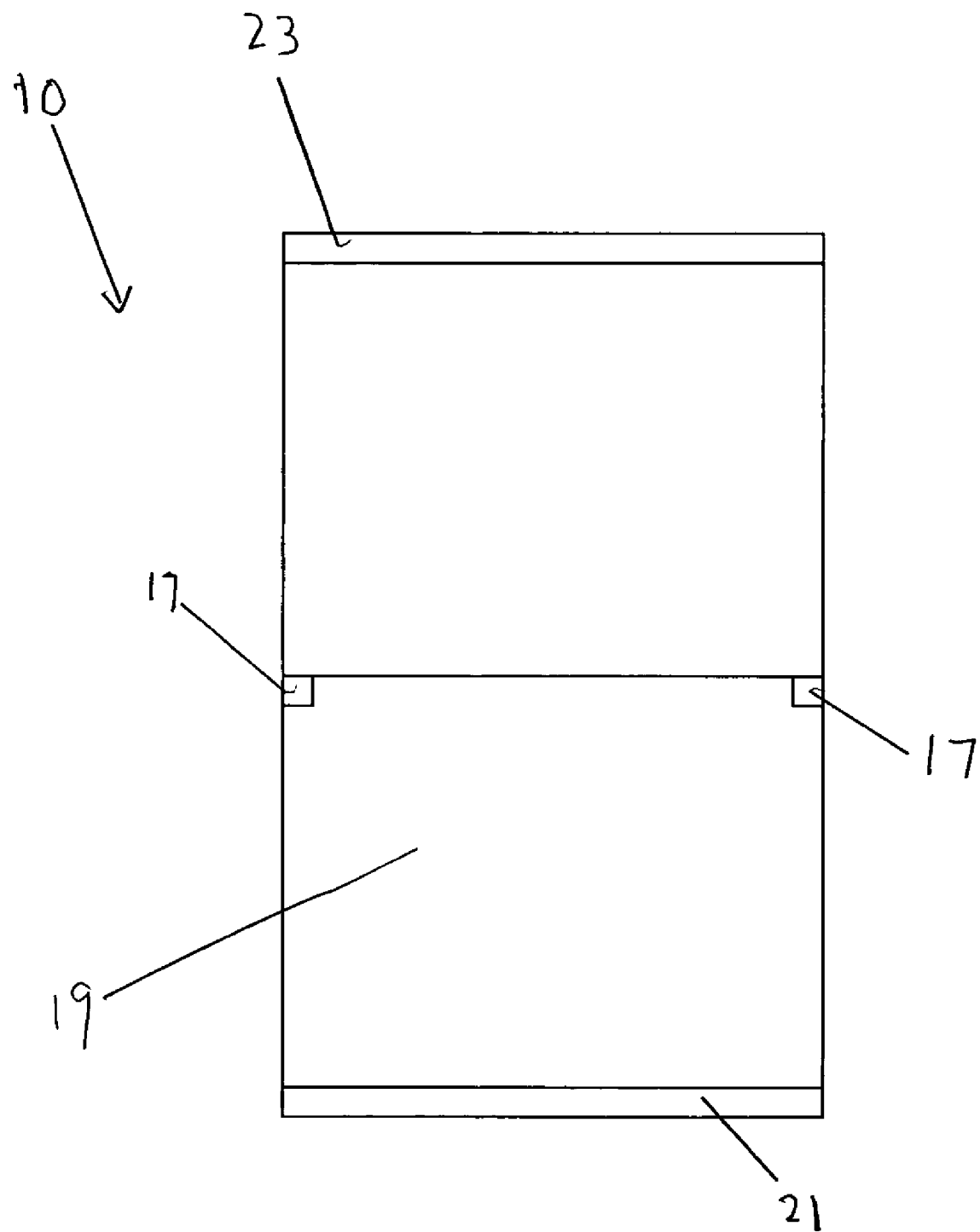
FIG. 5 shows a rear view of a holding device with attachment means in an open position.

FIG. 5 shows a rear view of holding device 10 with back portion 16 in an open position. FIG. 5 shows back portion 16 attached to rear wall 19 of holding device 10 by pivot members 17. Back portion 16 has snap member 23, which engage snap engagement portion 21 located on rear wall 19. When holding device 10 is going to be attached to collar 20, rear wall 19 is positioned on the front side of collar 20 and back portion 16 is positioned on the backside of collar 20. Back portion 16 is then pivoted about pivot members 17 and snap member 23 engages snap engagement portion 21 thereby attaching holding device 10 to collar 20. Back portion 16 may be constructed out of rubber or an equivalent resilient elastomeric material in order to minimize movement of holding device 10. Alternatively, the side of back portion 16 that comes into contact with collar 20 may be the only part that is constructed out of rubber or an equivalent elastomeric resilient material, or alternatively may have a surface structure that assists in preventing sliding of holding device 10 on collar 20.

Although back portion 16 is shown being attached via pivot members 17 to rear wall 19 and being snapped into place using snap member 23 and snap engagement portion 21, it is to be understood that alternative means for securing back portion 16 to rear wall 19 may be used. Back portion 16 may be attached by a hinge member to rear wall 19, or another means for attachment that permits opening and closing of back portion 16, such as utilizing axle 24 and having a separate rotating member. It is also possible to secure back portion 16 to rear wall 19 using magnets, hooks, or adhesive materials, such as hook and loop material. This removable attachment means enables one to replace a holding device 10 without removing or replacing the collar 20.

Figure 6:
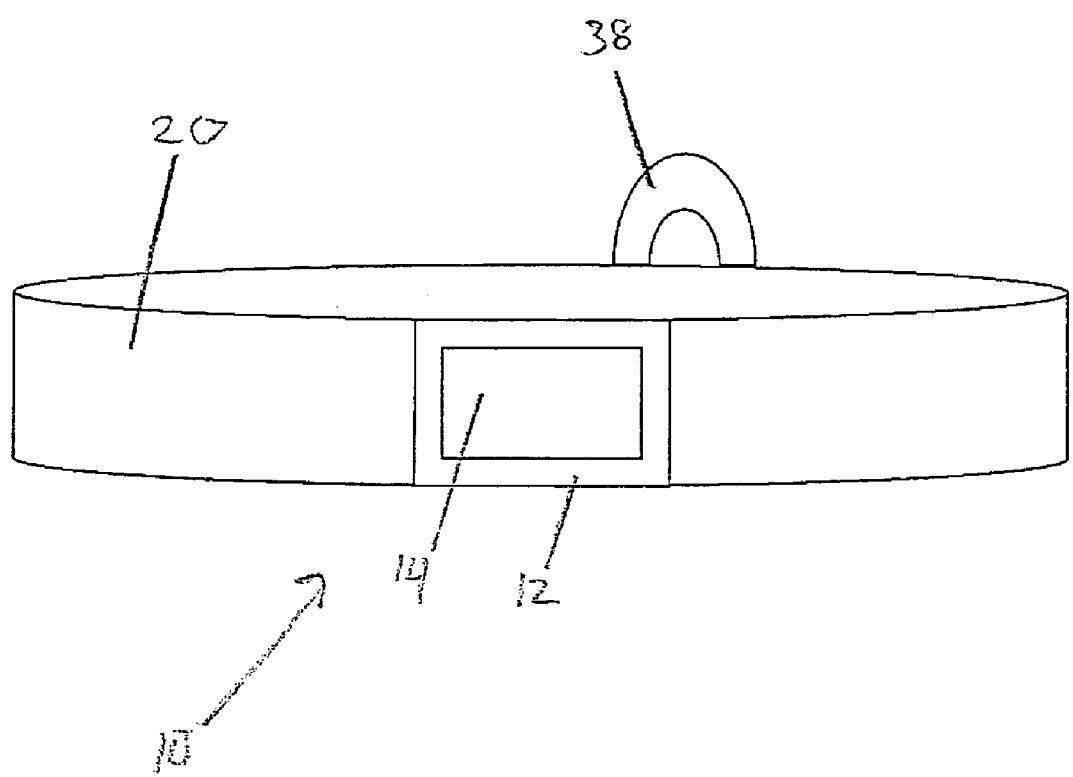
FIG. 6 shows an isometric view of a collar with a holding device.

FIG. 6 shows an isometric view of collar 20 with holding device 10 attached. Also shown is a leash attachment member 38. Collar 20 may be made of any type of material, such as, but not limited to, leather, cloth, or nylon. Holding device 10 may also be attached to harnesses or leashes.

In an alternative embodiment, holding device 10 may also be manufactured as an integral part of collar 20. When manufactured as part of collar 20, having back portion 16, snap engagement portions 21, and snap members 23 is optional. In an embodiment where holding device 10 is integral with collar 20, rear wall 19 may be optionally formed as part of collar 20, while securing member 15 will function in the same manner as described above.

Figure 7:
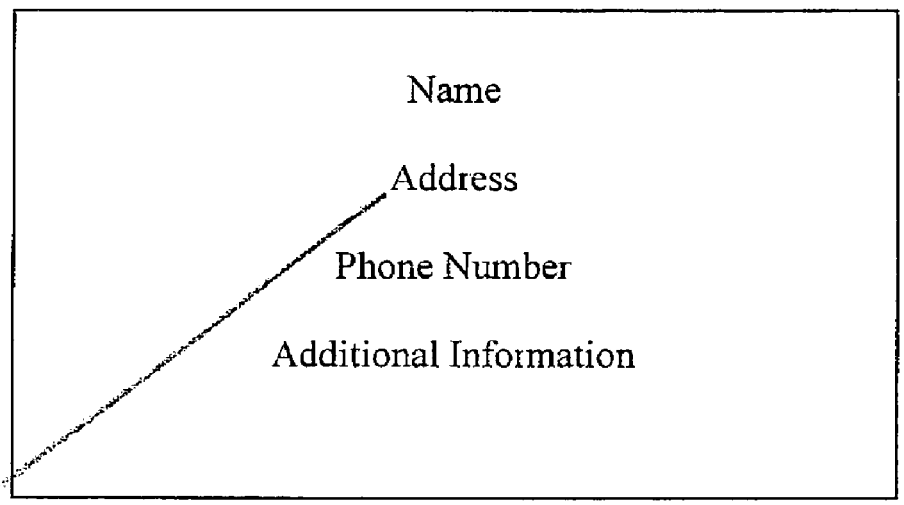
FIG. 7 shows an information article.

FIG. 7 shows an information article 40 that can be placed within holding device 10. Information article 40 typically has information 42 providing name, address, phone number, and other identifying information that would assist in tracking down the owner of a pet. Both sides of information article 40 may have information 42. Information article 40 may also come in a variety of shapes and sizes to correspond with the shape and size of the holding device 10 that is being used. Information article 40 may be made of waterproof material in order to prevent damage to information article 40 or ruining information 42 provided thereon. Information article 40 may be made of a variety of materials, including, but not limited to, plastic, leather, and metal.

Information article 40, as well as holding device 10, may be constructed to glow in the dark by being made with luminescent material. Holding device 10 or information article 40 may also have a small energy source and lighting device in order to provide light for ease of reading the information. Alternative embodiments may also have sound chips embedded in either holding device 10 or information article 40 in order to make sounds, play music, or have pre-recorded messages providing information about the animal. Ornamentation, such as designs, decorations, bells, etc. and various coloring are also possible for either holding device 10 or information article 40.

Figure 8:
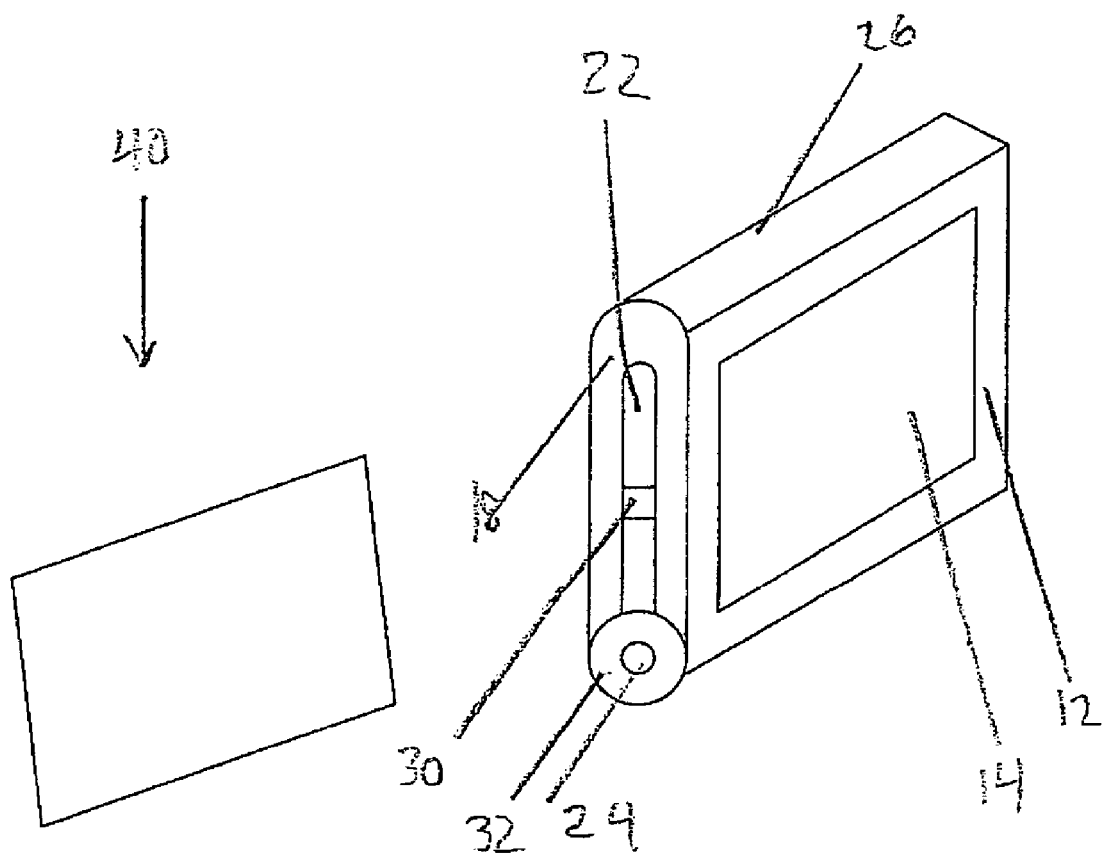
FIG. 8 shows an isometric view of a holding device and an information article.

FIG. 8 shows an isometric view of holding device 10 and information article 40. From this view it can be seen that information article 40 may also be slid into holding device 10 through side slot 22. In order to facilitate sliding information article 40 into holding device 10 while the holding device is attached to a collar, slot-blocking member 30 can be moved out of position from its slot blocking position. This method for replacing an information article minimizes distractions and discomfort to a pet, which enables an owner to quickly and efficiently replace an information article. This can be accomplished in a variety of ways.

Slot-blocking member 30 can be constructed so that it is made of flexible plastic. When an information article 40 needs to be placed within holding device 10, slot-blocking member 30 may be pushed towards the interior of holding device 10. After pushing information article 40 entirely within holding device 10, slot-blocking member 30 will then return to its original position.

It is also possible to have slot-blocking member 30 hingedly attached to frame 12 in order to facilitate insertion and replacement of an information article. In this scenario slot-blocking member 30 can be moved in a direction away from blocking side slot 22 to permit the insertion of an information article 40.

A second embodiment of holding device 10 will now be described below in reference to FIGS. 9-12.

The second embodiment has the advantage of using fewer parts to accomplish the same results of attaching and securing holding device 10 to a collar 20. In the second embodiment securing member 15 acts as both the means for attaching holding device 10 to collar 20 and for securing information article 40 in holding device 10.

Figure 9:
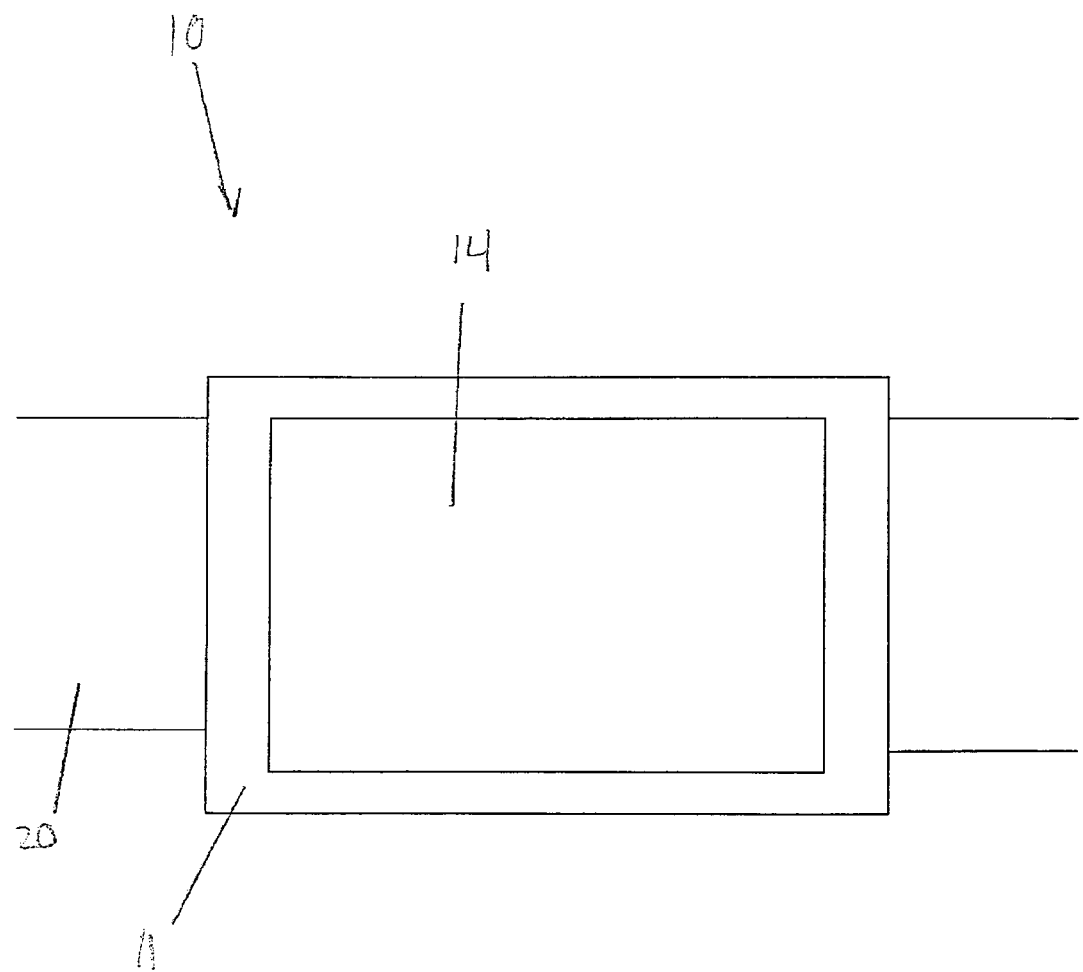
FIG. 9 shows a front view of a second embodiment of a holding device.

FIG. 9 shows a front view of a second embodiment of a holding device 10. In this embodiment securing member 15 also functions to attach holding device 10 to collar 20. Frame 11 frames window 14 and permits viewing of an information article 40 while held within holding device 10.

Figure 10:
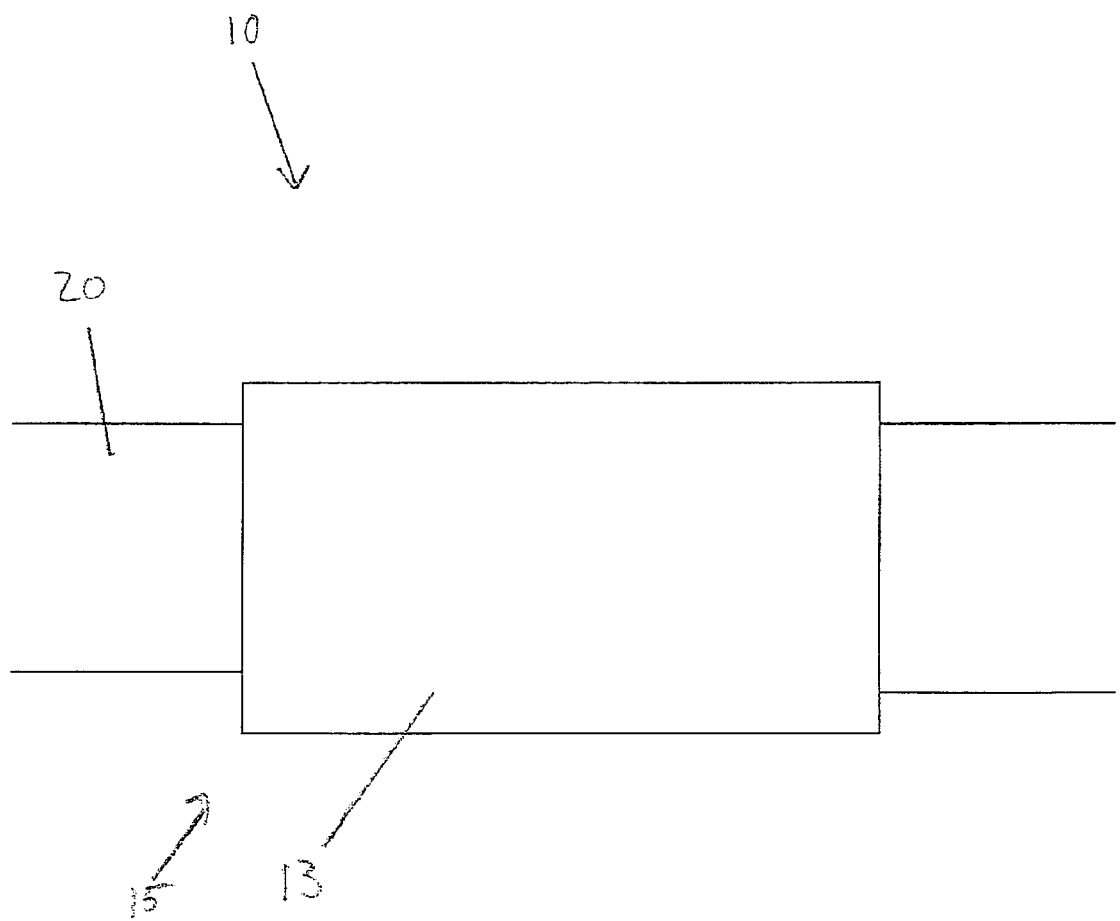
FIG. 10 shows a rear view of a second embodiment of a holding device.

FIG. 10 shows a back view of the second embodiment of holding device 10. Back portion 13 forms part of securing member 15 and is positioned on the opposite side of collar 20 from window 14. Back portion 13 will abut collar 20 and the surface of back portion 13 may be constructed of rubber or another resilient elastomeric material with a suitable coefficient of friction to prevent excessive movement of holding device 10 when it is attached to collar 20. Information article 40 will be placed between window 14 and collar 20 and back portion 13 will abut the opposite side of collar 20 when securing member 15 is in a closed position. This will cause holding device 10 to be attached to collar 20 and information article 40 to be securely held in holding device 10.

Figure 11:
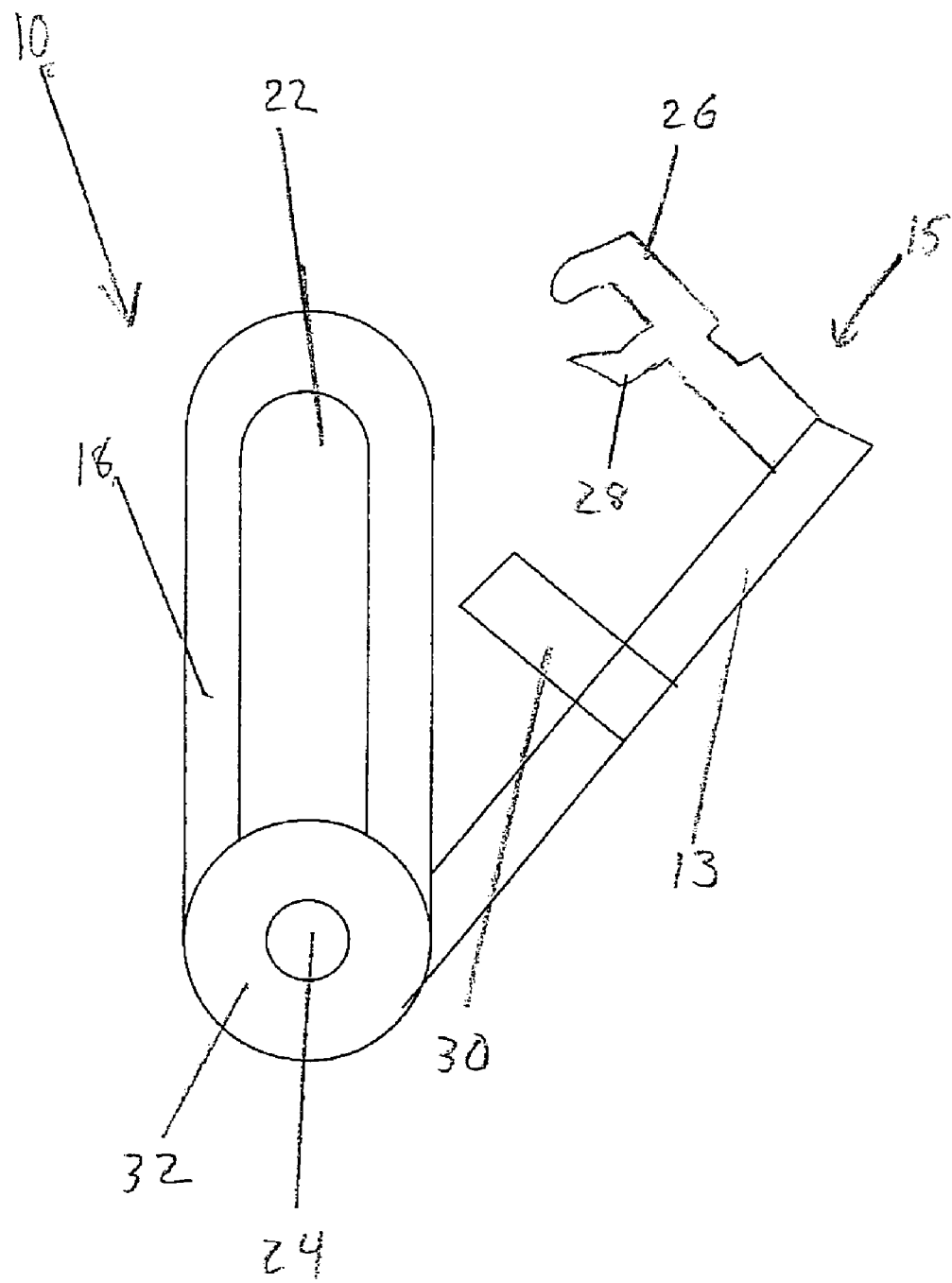
FIG. 11 shows a side view of a second embodiment of a holding device.

FIG. 11 shows a side view of a second embodiment of holding device 10. Securing member 15 is shown in an open position.

Securing member 15 functions to secure information article 40 within holding device 10 as well as attach holding device 10 to collar 20. Back portion 13 forms part of securing member 15 and when attached to collar 20, the surface of back portion 13 that is on the interior abuts collar 20. Rotation member 32 rotates around axle 24 and moves securing member 15 from an open position to a closed position. When moving into a closed position, snap portion 28 and clasping portion 26 act together to maintain securing member 15 in a closed position as well as firmly attaching holding device 10 to collar 20. Clasping portion 26 fits the contours of side portions 18 and with side portions 18 guides securing member 15 to its proper location in the closed position. Snap portion 28 engages snap engagement portion 34, shown in FIG. 12, and prevents securing member 15 from moving until securing member 15 is released from snap engagement portion 34. Slot blocking member 30 blocks side slot 22 when securing member 15 is in a closed position and prevents information article 40 from falling out of holding device 10.

When an information article 40 needs to be replaced, slot-blocking member 30 is moved to its non slot-blocking position and the information article 40 that need to be replaced is removed from holding device 10. A new information article 40 is then placed within holding device 10 and slot-blocking member 30 is then returned to its closed position. The process of placing a new information article 40 within holding device 10 can be accomplished while collar 20 is still being worn.

Figure 12:
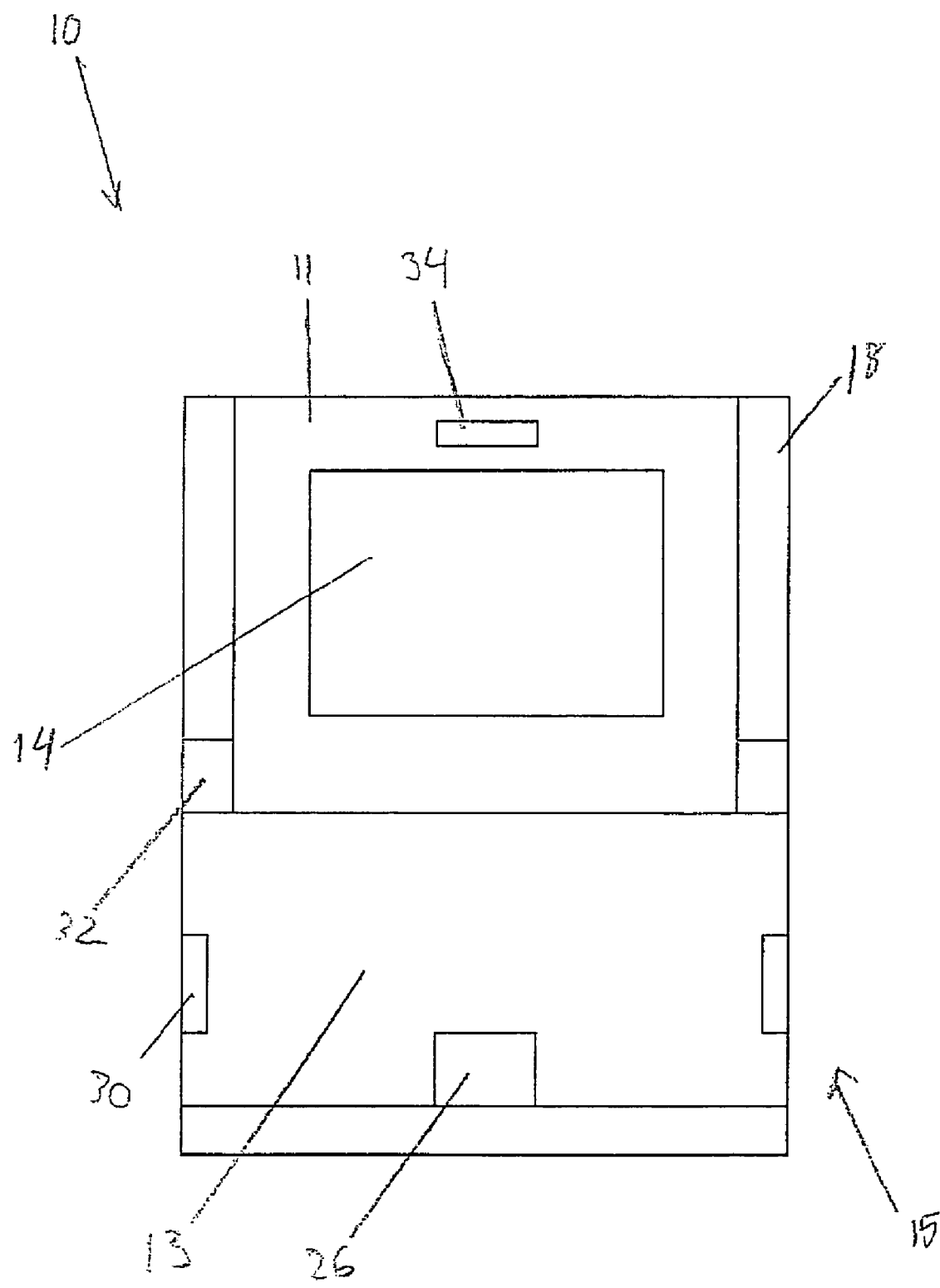
FIG. 12 shows an interior view of a second embodiment of a holding device with a securing member in an open position.

FIG. 12 shows an interior view of a second embodiment of a holding device 10 with securing member 15 in an open position. The interior view shows back portion 13 of holding device 10. Frame 11 has snap engagement portion 34 formed therein. When securing member 15 moves to a closed position, snap portion 28 engages snap engagement portion 34 and prevents securing member 15 from moving. The space formed between collar 20 and frame 11 when securing member 15 is in the closed position acts to hold information article 40.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An information article holding device comprising:
   an attachment member on a back portion of the holding device for placing a holding device on a collar;
   a holding member having a chamber defined by a side portion with a slot, sized to receive an information article, that traverses the length of the holding means and having at least one side opening;
   at least one slot blocking member connected to a securing member, said slot blocking member independently movable relative to the securing member, capable of blocking said slot; said securing member being rotatable and including a circular rotation member attached to a distal end of the holding member opposite from snap and clasp portions, said securing member forming a front portion of the holding member; and a viewing window for viewing an information article.

2. The information article holding device of claim 1, wherein said viewing window comprises a weatherproof plastic window or frame.

3. The information article holding device of claim 1, wherein said holding member is selected from the group consisting of rubber or plastic having a sufficient coefficient of friction to reduce movement of said holding means when attached to a collar or harness.

4. The information article holding device of claim 1, wherein said attachment member is capable of being detachably connected to a collar or harness.

5. The information article holding device of claim 4, wherein said attachment member is pivotally connected to said holding means.

6. A collar comprising;
- a holding means, for holding an information article, having a chamber defined by a side portion having at least one side opening defining a slot, said holding means being sized to receive an information article that is positionable within said holding means so as to extend the length of the holding means, said holding means having rounded edges;
- a securing member forming a front portion of said holding means;
- a slot blocking member, independently movable relative to the securing member, said slot blocking member being positionable in a middle said side opening so as to be capable of effectively blocking said side opening;
- said securing member being connected to said slot blocking member, said securing member being capable of closing and opening said holding means, wherein the securing member includes a protruding snap portion and a protruding clasp portion, at a distal end of the securing member, said snap portion and said clasp portion being contoured and positioned with respect to each other so as to securely attach to a rounded surface of the holding means;
- an attachment member, pivotally connected to said holding means forming a back portion of said holding means, said attachment member being capable of being detachably connected to a collar or harness and being constructed from a material selected from the group consisting of rubber and plastic, said attachment member further having a sufficient coefficient of friction to reduce movement of said holding means when attached to a collar or harness; and
- wherein said holding means comprises a transparent viewing window for viewing the information article, said transparent viewing window being constructed from a plastic material so as to be capable of protecting and weatherproofing an encased information article.

7. The collar of claim 6, wherein said securing member is rotatable and includes a circular rotation member attached to a distal end of the holding means opposite from the snap and clasp portions.

8. The holding device of claim 6, wherein said snap portion includes an angled wedge and wherein said clasp portion includes a 90° angled fitting for establishing a secure fitting with a rounded edge of the holding means.

9. The collar of clam 6, wherein the holding means is constructed from a luminescent material or includes an energy source and lighting device.

10. The holding device of claim 6, wherein said slot blocking member is constructed from a flexible plastic capable of deforming to allow entry of an information article in said side slot and automatically reassuming its original blocking orientation after depositing the information article without opening the securing member.

11. The holding device of claim 6, wherein said slot blocking member is hingedly attached to the securing member.

12. An information article holding device comprising;
- a holding means, for holding an information article, having rounded edges and a chamber defined by a side portion having at least one opening that defines a slot, sized to receive an information article, that traverses a length of the holding means;
- at least one slot blocking member capable of blocking said side opening;
- a securing member connected to a slot blocking member, said slot blocking member independently movable relative to said securing member, said securing member being capable of closing and opening said holding means, wherein the securing member includes a protruding snap portion and a protruding clasp portion, said snap portion and said clasp portion being contoured and positioned with respect to each other so as to securely attach to a rounded surface of the holding means; said securing member forming a front portion of the holding device;
- an attachment member, pivotally attached to said holding means, forming a back portion of the holding device and capable of being detachably connected to a collar or harness
- a viewing window for viewing an information article.

13. The information article holding device of claim 12, wherein said securing member is rotatable and includes a circular rotation member attached to a distal end of the holding means opposite from the snap and clasp portions.

14. The information article holding device of claim 12, wherein said snap portion includes an angled wedge and wherein said clasp portion includes a 90° angled fitting for establishing a secure fit with a rounded edge of the holding means.

15. The information article holding device of claim 12, wherein said attachment member further comprises a surface area constructed of material that reduces movement of said holding means when attached to a collar or harness.

16. The information article holding device of claim 15, wherein said surface area material is selected from the group consisting of rubber and plastic.

17. The information article holding device of claim 12, wherein said slot blocking member is constructed from a flexible plastic capable of deforming to allow entry of an information article in said side slot and automatically reassuming its original blocking orientation after depositing the information article without opening the securing member.

18. The information article holding device of claim 12, wherein said slot blocking member is hingedly attached to the securing member.

* * * * *